(12) United States Patent
Nimmagadda et al.

(10) Patent No.: US 10,616,279 B2
(45) Date of Patent: Apr. 7, 2020

(54) ADAPTABLE NETWORK EVENT MONITORING CONFIGURATION IN DATACENTERS

(71) Applicant: Nicira, Inc., Palo Alto, CA (US)

(72) Inventors: Srinivas Nimmagadda, San Jose, CA (US); Jayant Jain, Palo Alto, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 153 days.

(21) Appl. No.: 15/490,658

(22) Filed: Apr. 18, 2017

(65) Prior Publication Data

US 2018/0063195 A1 Mar. 1, 2018

Related U.S. Application Data

(60) Provisional application No. 62/381,515, filed on Aug. 30, 2016.

(51) Int. Cl.
*H04L 29/06* (2006.01)

(52) U.S. Cl.
CPC .......... *H04L 63/20* (2013.01); *H04L 63/0263* (2013.01); *H04L 63/1408* (2013.01)

(58) Field of Classification Search
CPC . H04L 63/20; H04L 63/0263; H04L 63/1408; H04L 29/06

USPC .............................................................. 726/2
See application file for complete search history.

(56) References Cited

U.S. PATENT DOCUMENTS

| | | | |
|---|---|---|---|
| 2014/0059641 A1* | 2/2014 | Chapman, II | G06F 21/554 726/1 |
| 2015/0341389 A1* | 11/2015 | Kurakami | H04L 63/20 726/1 |

* cited by examiner

*Primary Examiner* — Evans Desrosiers
(74) *Attorney, Agent, or Firm* — Adeli LLP

(57) ABSTRACT

Some embodiments provide a method for defining an adaptable monitoring profile for a network. The defined network monitoring profile is independent of the security policy defined for the network and includes one or more log generation rules, each of which defines a logging policy for a set of data compute nodes (DCNs) that share a common attribute. A log generation rule specifies whether the network activities of a set of DCNs that share a common attribute should be logged or not. A log generation rule can also specify other logging parameters such as priority level of the logs and the required logging protocol for transmission of the logs. The logging policy of a log generation rule is associated with a set of service rules (e.g., firewall rules) through a dynamic service group, and is applied to the service rules when any of these rules is triggered.

20 Claims, 11 Drawing Sheets

| Name | Criterion | Priority | Log: Inbound | | Outbound | | Log |
|---|---|---|---|---|---|---|---|
| | | | Allowed | Denied | Allowed | Denied | |
| Banking Apps | TAG = BCA | High | YES | YES | YES | YES | Netflow |
| LS2 VMs | Network = LS2 | Medium | YES | YES | NO | YES | Netflow |
| IT Department | Type = Developer | Low | NO | YES | NO | YES | Syslog |

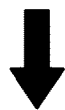

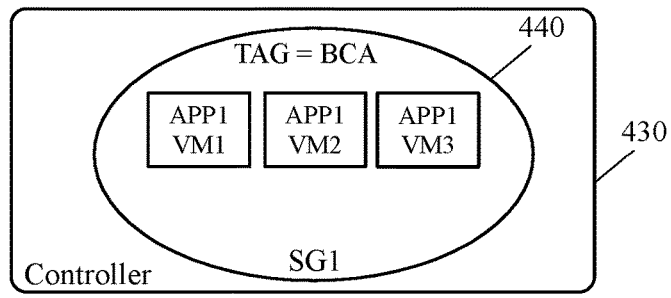

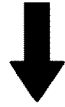

| | Source IP | Dest. IP | Source Port | Dest. Port | Service | Action | Policy |
|---|---|---|---|---|---|---|---|
| | EXT_IP | A2V1_IP | * | * | * | Drop | * |
| 455 | A2V1_IP | EXT_IP | * | 8080 | UDP | Allow | * |
| 460 | A1V1_IP | A2V1_IP | APP1_SP | 8080 | UDP | Allow | Log |
| | A1V1_IP | A2V2_IP | APP1_SP | APP2_DP | TCP | Allow | Log |
| 465 | A3V1_IP | A2V1_IP | * | * | * | Allow | * |
| 470 | A2V1_IP | A1V3_IP | * | APP2_DP | * | Deny | Log |
| | A1V1_IP | A2V3_IP | * | * | UDP | Allow | Log |

| Name | Criterion | Priority | Log: Inbound | | Outbound | | Log |
|---|---|---|---|---|---|---|---|
| | | | Allowed | Denied | Allowed | Denied | |
| Banking Apps | TAG = BCA | High | YES | YES | YES | YES | Netflow |
| LS2 VMs | Network = LS2 | Medium | YES | YES | NO | YES | Netflow |
| IT Department | Type = Developer | Low | NO | YES | NO | YES | Syslog |
| ⋮ | | | | | | | |

410, 420

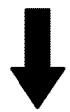

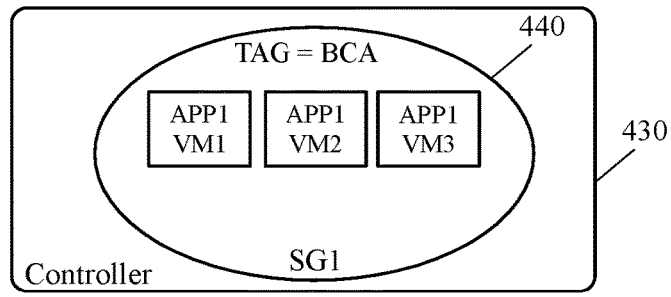

430, 440

| Source Identifier | Port | Dest. Identifier | Port | Service | Action | Policy |
|---|---|---|---|---|---|---|
| SG1 | * | SG2 | 8080 | TCP | Allow | Log |
| SG2 | * | Ext. Net. | * | UDP | Deny | * |
| SG2 | * | SG3 | * | * | Allow | * |
| SG2 | * | SG1 | * | TCP | Deny | Log |
| ⋮ | | | | | | |

| Name | Criterion | Priority | Log: Inbound | | Outbound | | Log |
|---|---|---|---|---|---|---|---|
| | | | Allowed | Denied | Allowed | Denied | |
| Banking Apps | TAG = BCA | High | YES | YES | YES | YES | Netflow |
| LS2 VMs | Network = LS2 | Medium | YES | YES | NO | YES | Netflow |
| IT Department | Type = Developer | Low | NO | YES | NO | YES | Syslog |
| ⋮ | | | | | | | |

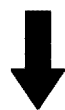

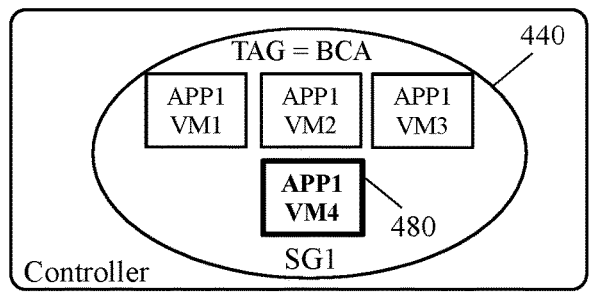

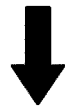

| Source IP | Dest. IP | Source Port | Dest. Port | Service | Action | Policy |
|---|---|---|---|---|---|---|
| EXT_IP | A2V1_IP | * | * | * | Drop | Log |
| A2V1_IP | EXT_IP | * | 8080 | UDP | Allow | Log |
| A1V1_IP | A2V1_IP | APP1_SP | 8080 | UDP | Allow | Log |
| A1V1_IP | A2V2_IP | APP1_SP | APP2_DP | TCP | Allow | No Log |
| A1V4_IP | EXT_IP | *** | * | * | Allow | Log** |
| A2V1_IP | A1V3_IP | * | APP2_DP | * | Deny | Log |
| A1V1_IP | A2V3_IP | * | * | UDP | Allow | No Log |
| ⋮ | | | | | | |

*Fig. 4C*

| Name | Criterion | Priority | Log: Inbound | | Outbound | | Log |
|---|---|---|---|---|---|---|---|
| | | | Allowed | Denied | Allowed | Denied | |
| Banking Apps | TAG = BCA | High | YES | YES | YES | YES | Netflow |
| LS2 VMs | Network = LS2 | Medium | YES | YES | NO | YES | Netflow |
| IT Department | Type = Developer | Low | NO | YES | NO | YES | Syslog |
| ⋮ | | | | | | | |

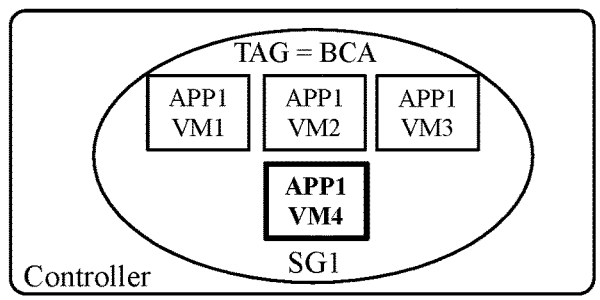

| Source IP | Dest. IP | Source Port | Dest. Port | Service | Action | | Pointer | Policy |
|---|---|---|---|---|---|---|---|---|
| EXT_IP | A2V1_IP | * | * | * | Drop | ↔ | Rec1 | Log |
| A2V1_IP | EXT_IP | * | 8080 | UDP | Allow | ↔ | Rec2 | Log |
| A1V1_IP | A2V1_IP | APP1_SP | 8080 | UDP | Allow | ↔ | Rec3 | Log |
| A1V1_IP | A2V2_IP | APP1_SP | APP2_DP | TCP | Allow | ↔ | Rec4 | No Log |
| A1V4_IP | EXT_IP | * | * | * | Allow | ↔ | Rec5 | Log |
| A2V1_IP | A1V3_IP | * | APP2_DP | * | Deny | ↔ | Rec6 | Log |
| A1V1_IP | A2V3_IP | * | * | UDP | Allow | ↔ | Rec7 | No Log |
| ⋮ | | | | | | | ⋮ | |

| Name | Criterion | Priority | Log: Inbound | | Outbound | | Log |
|---|---|---|---|---|---|---|---|
| | | | Allowed | Denied | Allowed | Denied | |
| Banking Apps ⋮ | TAG = BCA | High | YES | YES | Yes | YES | Netflow |

640, 610, 620

| Source IP | Dest. IP | Source Port | Dest. Port | Service | Action | Policy |
|---|---|---|---|---|---|---|
| EXT_IP | A2V1_IP | * | * | * | Drop | Log |
| A2V1_IP | EXT_IP | * | 8080 | UDP | Allow | Log |
| A1V1_IP | A2V1_IP | APP1_SP | 8080 | UDP | Allow | Log |
| A1V1_IP | A2V2_IP | APP1_SP | APP2_DP | TCP | Allow | Log |
| A3V1_IP ⋮ | A2V1_IP | * | * | * | Allow | Log |

630, 650

---

T2

| Name | Criterion | Priority | Log: Inbound | | Outbound | | Log |
|---|---|---|---|---|---|---|---|
| | | | Allowed | Denied | Allowed | Denied | |
| Banking Apps ⋮ | TAG = BCA | High | YES | YES | NO | YES | Netflow |

620

| Source IP | Dest. IP | Source Port | Dest. Port | Service | Action | Policy |
|---|---|---|---|---|---|---|
| EXT_IP | A2V1_IP | * | * | * | Drop | Log |
| A2V1_IP | EXT_IP | * | 8080 | UDP | Allow | Log |
| A1V1_IP | A2V1_IP | APP1_SP | 8080 | UDP | Allow | No Log |
| A1V1_IP | A2V2_IP | APP1_SP | APP2_DP | TCP | Allow | Log |
| A3V1_IP ⋮ | A2V1_IP | * | * | * | Allow | Log |

ADAPTABLE NETWORK EVENT MONITORING CONFIGURATION IN DATACENTERS

BACKGROUND

Network Security administrators depend heavily on monitoring security logs from firewalls, intrusion prevention systems, servers, applications and other such components of a network to better understand and secure a network. Conventionally, security devices such as firewalls and intrusion prevention systems are deployed at the perimeter of the networks and as such they can only send logs related to the traffic that is entering or exiting the perimeter. Micro segmentation paradigm that has been recently introduced to the market employs distributed firewall to effectively enable every virtual machine of a virtual network to have a firewall of its own. Enabling event logging for all firewall connections (i.e., for both north-south and east-west traffic), however, has a significant performance impact on network efficiency. Additionally, event monitoring servers cannot support the amount of logs that firewalls send out if logs are enabled for all connections.

Firewall vendors thus provide configuration options to granularly enable logs on a rule-by-rule basis to address the scale and performance issues on the firewalls, as well as the log monitoring servers. The main shortcoming of rule-based event monitoring configuration, however, is that while monitoring critical applications is often the purpose of event monitoring, rule-based monitoring is implemented solely based on firewall rules and not the applications. As such, implementing an application-based change in rule-based approach is quite challenging. For example, a simple change in logging policy of an application would require modification of a vast number of firewall rules that correspond to the application. Additionally, the number of logs sent to a log server cannot be adjusted based on an intelligent feedback mechanism in rule-based monitoring.

BRIEF SUMMARY

Some embodiments provide a method for defining an adaptable monitoring profile for a network. The defined network monitoring profile includes one or more log generation rules, each of which defines logging behavior of a set of data compute nodes (DCNs) that share a common attribute. A log generation rule, in some embodiments, specifies whether the network events associated with the set of DCNs (virtual machines, containers, etc.) should be logged or not. A log generation rule may also specify other logging parameters such as priority level of the logs and the required logging protocol for transmission of the logs. For instance, a log generation rule of a monitoring profile may specify how urgently the network events associated with a log generation rule should be reported (logged) compared to network events associated with other log generation rules. Similarly, a log generation rule may specify the logging protocol (e.g., Syslog, Netflow, etc.) that the DCNs use to report the network events (e.g., to a security monitoring server).

A shared attribute for a set of DCNs can be any property or characteristic that is common between the DCNs of the set. For instance, a particular application (or a particular layer of a multi-layer application) that is implemented by a set of DCNs, can be the common attribute shared by the DCNs. In such a case, a log generation rule may define a monitoring policy for every DCN of the set (e.g., for every web-tier server that implements a distributed web application) to generate, or not to generate, a log message upon occurrence of a certain event. The DCNs may share any other common attribute in other embodiments (e.g., all DCNs that have a full or partial common name, all DCNs having a same particular type, all DCNs of the same subnet, all DCNs of a logical network of a tenant, etc.).

In order to define a monitoring policy (that specifies logging behavior) for a specific group of DCNs, some embodiments define the monitoring policy for a dynamic service group (e.g., a security group), with which the DCNs are associated (e.g., all DCNs are tagged with the same tag of the dynamic group). That is, in some embodiments, each log generation rule of a security monitoring profile is associated with a dynamic group, the members of which share a common criterion (e.g., a network characteristic) that is specified in the log generation rule.

A dynamic group, in some embodiments, may include any type of network entity (e.g., virtual machines, namespaces, applications, one or more virtual network interface controllers (VNICs), host machines, or any other compute and/or network construct that participates in a logical and/or physical network). In some embodiments, a dynamic group is defined as a data structure (e.g., a dynamic container in a controller) that can have members dynamically added to and/or removed from the data structure.

Linking a log generation rule of a security monitoring profile to a dynamic group enables a user (e.g., a datacenter provider) to dynamically add, remove, or modify logging policies for several different DCNs by simply modifying a rule's definition. For example, every time a monitoring policy in a log generation rule is updated, the logging policy of every DCN for which the monitoring policy is defined (i.e., all of the DCNs of the dynamic group linked to the log generation policy), will be automatically updated.

Associating the log generation rules with dynamic groups also enables the network to dynamically add a monitoring policy to any DCN that is added to a dynamic group, and to remove the policy from any DCN that leaves the dynamic group. For example, as soon as a new virtual machine (VM) is instantiated in a host machine, based on which dynamic group the VM is tagged to, a new monitoring policy (that defines a new logging behavior) for network communications associated with the VM is automatically defined for the VM.

Each log generation rule, in a monitoring profile of some embodiments, determines whether the network traffic (i.e., data messages) communicated with a set of DCNs should be logged or not. That is, a log generation rule determines whether data communication with an application running on a DCN should be reported to an event monitoring application or not. In order to make such a determination, some embodiments apply the monitoring policy on a set of security rules (e.g., firewall rules) defined for the network traffic that is sent to and/or originated from the DCNs. These security rules are generated based on a security policy that is defined for the network (e.g., by a user) in some embodiments.

Although the monitoring policy is applied to the security rules, the monitoring profile for the network is defined independently from a security policy defined for the network. That is, some embodiments receive a security policy (from a network administrator) and generate a set of firewall rules to be applied to different entities of the network (e.g., end machines, forwarding elements, etc.). Although the defined network monitoring profile is received independent of the security policy, the monitoring profile is associated with the generated firewall rules through different dynamic groups. That is, each log generation rule of the monitoring profile is linked to a set of DCNs and specifies the logging behavior of the DCNs through a dynamic service group that is associated with the DCNs. Based on the specified logging behavior, each time a security operation is performed on network traffic (e.g., data messages) that is sent to or received from the DCNs, a resolution of such security operation is logged and sent to a log server.

By applying the logging policy to the firewall rules, each time a firewall rule is triggered (i.e., each time a firewall operation is performed on a data message that is sent to a VM or received from the VM), a logging policy (behavior) associated with the firewall rule determines whether the event should be logged, so that it can be reported to a security monitoring application (which runs on one or more log servers). That is, the logging policy determines whether a resolution of a firewall rule applied to a data message (i.e., a packet) sent to and/or received from a DCN, should be logged for forwarding to a log server or not. A firewall rule for a DCN may be triggered, for example, when the specification of a data packet received at the DCN matches the specification of the firewall rule (e.g., when the five-tuple of the packet headers match the identification fields of the rule).

Some embodiments identify a dynamic group, with which a security rule is associated, each time the security rule is triggered. Identification of the dynamic group results in identifying a log generation rule that is associated with the dynamic group. Therefore, a modification in the logging policy of a log generation rule, at any particular instance of time, will result in application of the modified policy to any security rule that is triggered after the particular instance of time. Some embodiments apply a default log policy to members of a dynamic group, for which a log generation policy is not defined. For instance, a default log policy may specify that every triggered firewall rule that is not associated with a defined log generation rule should generate and report a log to a monitoring application (that runs on a log server).

In some embodiments, a user (e.g., a network administrator, a tenant of a datacenter, etc.) defines a network monitoring profile that provides one or more logging policies for one or more sets of DCNs (associated with one or more dynamic groups). Some embodiments generate a new dynamic group for a set of DCNs that has a common attribute and for which no dynamic group has been previously generated. In some embodiments, the user defines a network monitoring policy for one or more networks (e.g., logical networks) through a set of application programming interface (API) calls to a management and control system of the network (e.g., a manager machine or application in a management and control cluster). The management and control system, based on the user's definition, configures a set of host machines that hosts the DCNs (having a common attribute) to implement the monitoring policy. The set of host machines implements the policy by applying the policy to a set of distributed firewall rules that are defined for the network traffic destined for and/or originated from the DCNs.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all of the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 4A-4D illustrate how a security group creates an association between a logging policy defined in a log generation rule and multiple firewall rules defined in multiple formats.

FIG. 6 illustrates an example of modifying a logging policy by changing a field in a log generation rule and dynamically applying the modified policy on a corresponding firewall rule (i.e., without making any modification in any of the firewall rules).

DETAILED DESCRIPTION OF THE INVENTION

Figure 1:
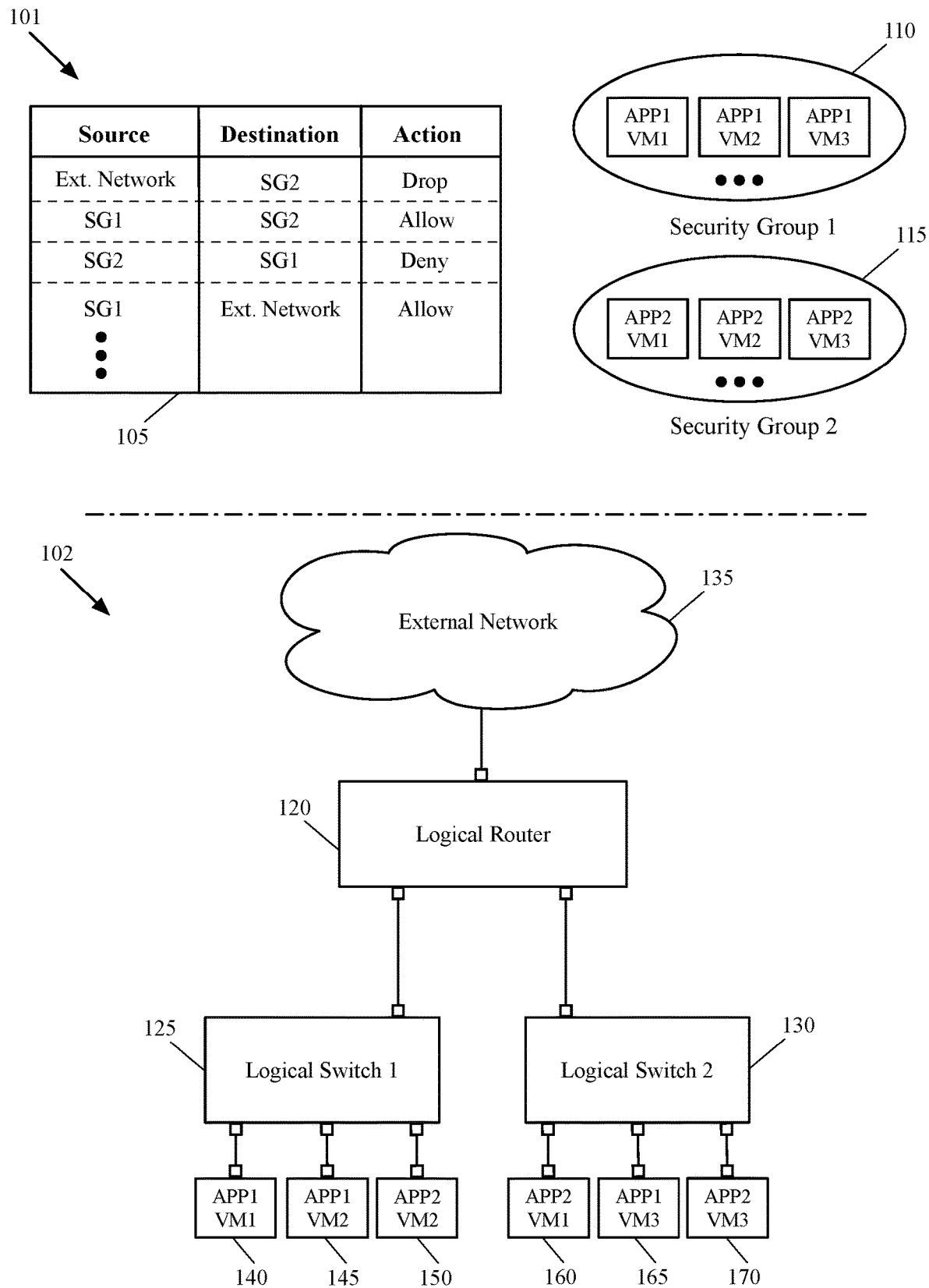
FIG. 1 illustrates a security policy of some embodiments that is defined by a user to be applied to a logical network (e.g., a logical network defined for a tenant of a hosting system).

In the following detailed description of the invention, numerous details, examples, and embodiments of the invention are set forth and described. However, it should be understood that the invention is not limited to the embodiments set forth and that the invention may be practiced without some of the specific details and examples discussed.

Conventional network monitoring systems define monitoring policies based on firewall rules. That is, each time a firewall rule is triggered, a log message corresponding to the triggered rule could be generated and sent to a log server (using a particular logging protocol), if the network monitoring policy requires so. As such, for a single application running on multiple servers, tens of thousands of firewall rules, based on the application IP addresses, may be generated and stored on the host machines of a hosting system. When a log policy is to be enabled or modified for the application, network administrators are required to query all the corresponding rules and enable or modify the logging policy in every single rule. For a critical application, the network events of which must be continuously logged, a network administrator may forget to enable logging for a new firewall rule when the administrator adds the firewall rule for the application.

Additionally, security monitoring expectations in enterprise datacenters may change from time to time. For example, security posture of an individual application may change over a period of time based on the activity of the application. Similarly, security monitoring requirements of a hosting system could be different under different circumstances. For example, during normal business conditions the event loggings required in a datacenter might be quite different compared to when, for example, the enterprise is under a malicious attack. Similarly, a sales company may need to tune down the logging process (i.e., to generate less log messages) during a sales event (e.g., Christmas sales), while during a regular season, logging policies should be restored to normal conditions. Currently, enabling security logging in a dynamic manner for a rule-based log configuration is quite challenging.

As described above, in the micro segmentation paradigm, firewall rules are implemented in a distributed manner. That is, a user (e.g., a network administrator) defines a security policy that should be applied to a network (e.g., a logical network of a tenant of a hosting system). The defined security policy of some embodiments can specify one or more security rules (also referred to as high-level firewall rules) that each is defined in terms of one or more dynamic groups. These dynamic groups, in turn, are associated with one or more data compute nodes (DCNs). The defined security rules can be deployed and processed as is (i.e., with the dynamic group identifiers as rule qualifiers) in the data path in some embodiments.

The high-level firewall rules that are defined in a security policy are processed, in some embodiments, by a native firewall engine in the data plane. This data-plane version of the firewall rule uses the dynamic group identifiers defined in the high-level firewall rules to define the source and destination address identifiers, which are two of the qualifiers of the firewall rule. That is the source and destination address identifiers are two rule attributes that are to be compared to the parameters of a data message (e.g., a packet) that is to be processed. In processing a packet, the firewall engine will determine whether the data message's source and destination IP addresses are within the dynamic group identifiers of the high-level firewall rule.

In some other embodiments, the management and control system converts the security policy rules defined by a user to a set of firewall rules (e.g., having a typical five-tuple source and destination IPs, source and destination ports, and protocol, accompanied by an action) in the data plane. The management and control plane also configures a firewall module or engine on each host machine for applying the firewall rules on the network traffic that is destined for and/or originated from the logical network's end machines (i.e., DCNs) that run on the host machine. The firewall module of some embodiments is instantiated in the virtualization software (e.g., hypervisor) of the host machine and applies the network security policy on the network traffic that passes through the hypervisor. As described in more detail below, the firewall module communicates with a managed forwarding element, that also executes in the hypervisor of the host machine, in order to apply the network security policy on the network traffic.

FIG. 1 illustrates a security policy 101 of some embodiments that is defined by a user to be applied to a logical network such as the logical network architecture 102. The top half of the figure includes a security policy table 105 and two security groups 110 and 115. The security policy table 105 includes one or more security rules that each is defined in terms of three fields, a source, a destination, and a corresponding action. As shown, each one of the source and destination fields includes a security group, or alternatively, one or more addresses to an external network.

Each one of the security groups 110 and 115 also includes a set of VMs that are logically connected to the logical network 102. A security rule, in some embodiments, is a high-level firewall rule for a network traffic from one or more source nodes to one or more destination nodes. As shown, each high level security rule of the table 105 includes a security group (i.e., dynamic group) that defines the source nodes of the traffic, a security group that defines the destination nodes for the traffic, and an action (e.g., drop, allow, redirect, etc.) that should be taken if the network traffic (e.g., a data packet) matches the rule (i.e., the identification data of the packet matches the identification data stored in the rule). In some embodiments, table 105 includes many other fields, which are not shown in this figure for the simplicity of description. For example, some embodiments define a security group for each security rule of the table, which defines the enforcement points at which, the security rule should be applied (also known as AppliedTo field).

A security group (also referred to as a dynamic group), in some embodiments, includes a set of network elements (e.g., one or more virtual network controllers (VNICs), one or more virtual machines (VMs), one or more hosts, one or more forwarding elements (physical and logical), or any other compute construct and/or network construct that participates in a logical and/or physical network). In some embodiments, a security group is a dynamic data structure (e.g., a dynamic container) stored in a controller that can have members (e.g., DCNs) dynamically added to and/or removed from the data structure. When automated deployment tools deploy data compute nodes on host computers, these tools in some embodiments dynamically associate the DCNs with tags that seamlessly associate the DCNs with dynamic groups. A data compute node can be any type of machine such as a virtual machine (VM), a container, a namespace, etc.

As shown, the security group 110 includes three virtual servers that implement a particular distributed application (or a particular layer of a distributed application), while security group 115 includes three other virtual servers that implement a different application (or a different layer of the same distributed application). For example, the three VMs 140, 145, and 165 that are in the first security group 110 may each be a different tier's VM that implements a different layer (e.g., database layer) of a distributed application. Alternatively, these VMs may be three different servers of the same tier (e.g., web tier) that along with other servers of other tiers implement a multi-layer application.

A multi-layer distributed application (e.g., for a tenant of a hosting system), in some embodiments, is implemented by different machines (e.g., VMs) that are logically connected to each other in a logical network (e.g., the tenant's logical network). These machines, however, may spread across several host machines that implement the logical network. For example, a three-tier distributed application of a tenant of a datacenter may be implemented by several different web servers (in the web-tier), application servers (in the application tier), and database servers (in the database tier) that are logically connected to the tenant's logical network. These virtual servers may run on several different host machines that implement the logical network (they may also run on a same host machine).

The first security rule of the security policy table 105 specifies that any network traffic from the external network that is headed to the second security group (SG2) should be dropped. That is, any packet that is received from the outside network at any of the VMs of the second security group should be dropped. The second security rule allows network traffic to be sent from the first security group (SG1) to the second security group (SG2), while the third rule denies any reversed traffic.

The bottom half of FIG. 1 shows a logical network architecture 102, which includes a logical router 120 and two logical switches 125 and 130. The logical router 120 connects the logical switches 125 and 130 to each other and to the external network 130. The VMs 140-150 are logically connected to each other, to the VMs 160-170, and to the external network 130, through the logical forwarding elements 120-130. The external network 135 could be another logical network implemented by the same hosting system's physical network, or it could be any other physical and/or logical network outside the hosting system.

A logical network, logically connects different DCNs (e.g., of a tenant in a hosting system), which run on one or more host machines, to each other and to other end machines. In some embodiments, a user defines a logical network topology (i.e., defines the logical network elements and the connections between these elements) for the logical network through a management and control system of the logical network. The management and control system (manager and controller machines and/or applications) of a logical network receives the logical network elements, generates configuration data, and pushes the initial and runtime configuration data to a set of physical nodes (e.g., host machines, gateway machines, etc.) of the hosting system in order to configure the physical nodes to implement the logical network.

The bottom half of the figure shows that two of the VMs 140 and 145 of the logical network (belonging to the first security group 110) are logically connected to the network through the first logical switch 125. The third VM 165 of the first security group, however, is logically connected to the logical network through a logical port of the second logical switch 130. Also, two of the VMs 160 and 170 of the second security group 115 are logically connected to the logical network through the second logical switch 130, while the third VM 150 is logically connected to the logical network through the first logical switch 125.

The same way that the VMs of the same security group are not necessarily connected to the same logical switch, as will be shown below by reference to FIGS. 2A-2B, the VMs that are connected to the same logical switch are not necessarily hosted by the same host machine. That is, different managed forwarding elements each of which operates on a different host machine, may implement different logical ports of a same logical switch. As such, a physical port of each managed forwarding element, to which a logical port of the logical switch is mapped, connects to a VM that is coupled to the logical port of the logical switch.

While the different DCNs are shown as VMs in this figure and other figures below, it should be understood that other types of data compute nodes (e.g., namespaces, containers, etc.) may connect to logical forwarding elements in some embodiments. It should also be understood that a logical network, in some embodiments, in addition to the illustrated different L2 and L3 logical forwarding elements, can include other logical network elements (e.g., logical firewall, logical load balancer, etc.) that are placed on different logical paths of the logical network.

As described above, rule-based network security monitoring is not ideal for a context-based network security implementation. Enabling security logging in a dynamic manner for a rule-based log configuration is quite challenging. To overcome these and many other challenges, some embodiments provide a method for defining an adaptable network monitoring profile for a network. The network monitoring profile can be dynamically changed when the requirements of the network and/or the needs of network users are changed. The defined monitoring profile, in some embodiments, includes one or more log generation rules that each defines a monitoring policy for a set of data compute nodes (DCNs) that share a common attribute. A DCN can be any physical or virtual machine capable of connecting to a network (e.g., physical or logical network).

A log generation rule, in some embodiments, specifies whether the network activities of a set of DCNs (e.g., a set of VMs, containers, etc.) that share a common attribute should be logged. A log generation rule can also specify other logging policy parameters such as priority level of the logs, as well as which logging protocol should be used for each log generation rule. For instance, a log generation rule of a monitoring profile may specify how urgently the network events associated with a log generation rule should be reported (logged) compared to network events associated with other log generation rules. Similarly, a log generation rule may specify the logging protocol (e.g., Syslog, Netflow, etc.) that the DCNs use to report the network events to a log monitoring application.

A shared attribute for a set of DCNs can be any property or characteristic that is common between the DCNs of the set. For instance, a particular application (or a particular layer of a multi-layer application) that is implemented by a set of DCNs, can be the common attribute shared by the DCNs. In such a case, a log generation rule may define a monitoring policy for every DCN of the set (e.g., for every web-tier server that implements a distributed web application) to generate, or not to generate, a log message upon occurrence of a certain event. The DCNs may share any other common attribute in other embodiments (e.g., all DCNs that have a full or partial common name, all DCNs having a same particular type, all DCNs of the same subnet, all DCNs of a logical network of a tenant, etc.).

In order to define a monitoring policy for a specific group of DCNs, some embodiments define the monitoring policy for a dynamic group (e.g., a security group), with which the DCNs are associated (e.g., all DCNs are tagged with the same tag of the dynamic group). That is, in some embodiments, each log generation rule of a security monitoring profile is associated with a dynamic group, the members of which share a common criterion (e.g., characteristic) that is specified in the log generation rule.

A dynamic group, in some embodiments, may include any type of network entity (e.g., virtual machines, applications, one or more virtual network controllers (VNICs), host machines, or any other compute and/or network construct that participates in a logical and/or physical network). In some embodiments, a dynamic group can be defined as a dynamic data structure (e.g., created in a controller of the network) that can have members dynamically added to and/or removed from the data structure.

In some embodiments, a user (e.g., a network administrator, a tenant of a datacenter, etc.) defines a network monitoring profile that provides one or more logging policies for one or more sets of DCNs (associated with one or more dynamic groups). Some embodiments generate a new dynamic group for a set of DCNs that has a common attribute and for which no dynamic group has been previously generated. The user defines a network monitoring policy for one or more networks (e.g., logical networks) through a set of application programming interface (API) calls to a management and control system of the network (e.g., a manager machine or application in a management and control cluster). The management and control system, based on the user's policy definition, configures a set of host machines that hosts the DCNs (having a common attribute) to implement the monitoring policy. The set of host machines implement the policy by applying the policy to a set of distributed firewall rules that are defined for the network traffic destined for and/or originated from the DCNs.

Figure 2A:
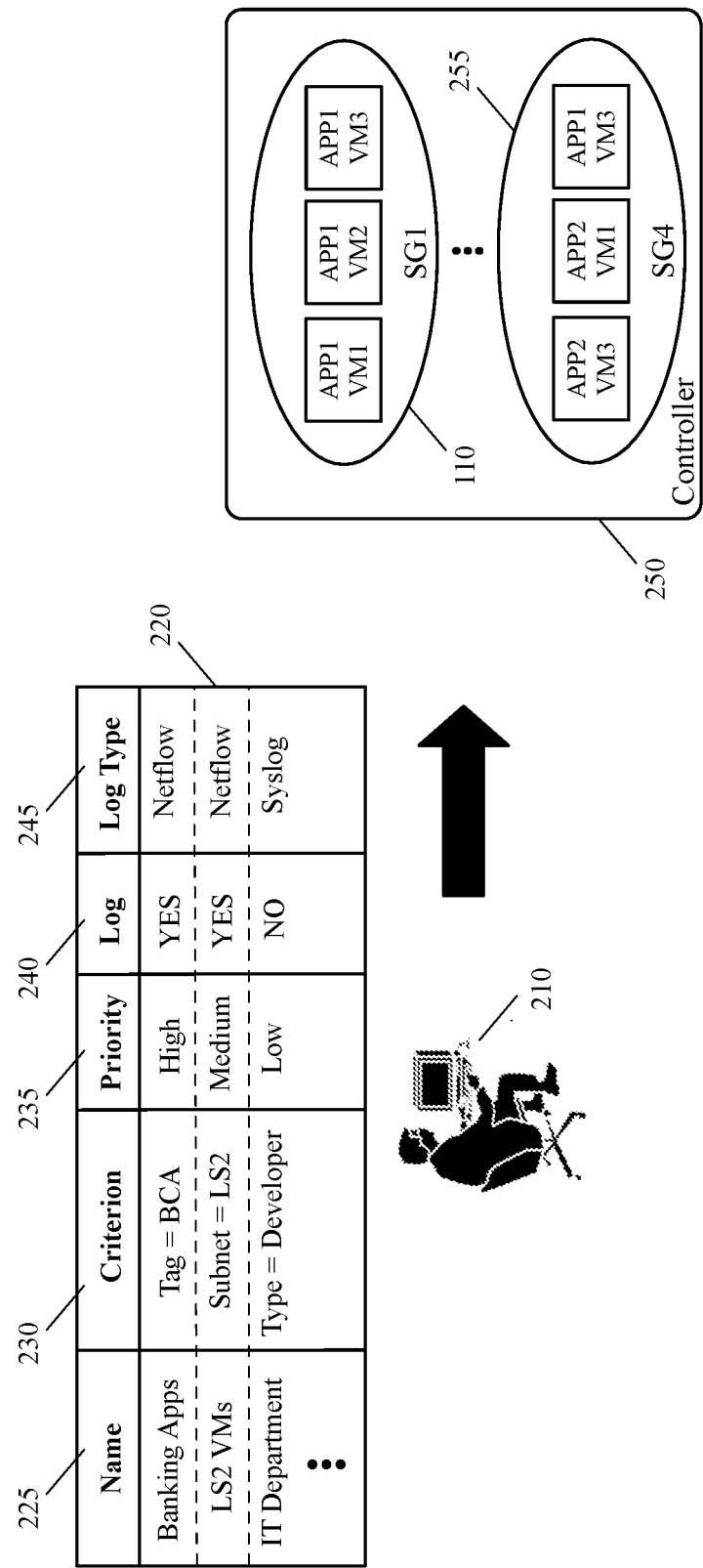
FIGS. 2A-2B illustrate an example of defining an adaptable network monitoring profile that includes several log generation rules and the implementation of the monitoring policies by associating the log generation rules to dynamic groups.
Figure 2B:
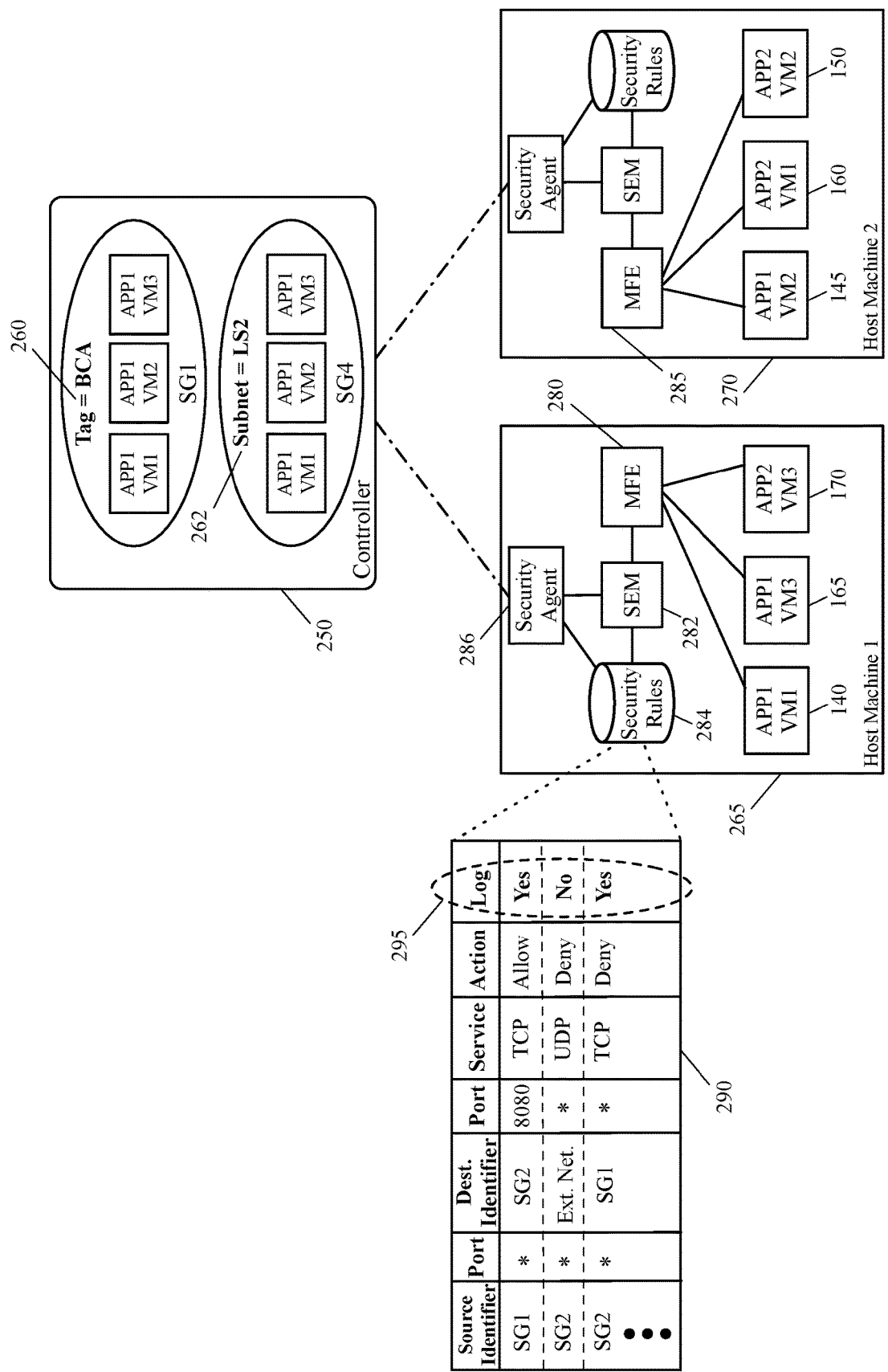

FIGS. 2A-2B illustrate an example of defining an adaptable network monitoring profile that includes several log generation rules and the implementation of the monitoring policies by associating the log generation rules to dynamic groups. Specifically, FIG. 2A illustrates how, in some embodiments, a user defines a monitoring policy with log generation rules that are independent from the security policy defined for the network. FIG. 2B then shows how, in some such embodiments, the defined log generation rules are applied to the defined security policy (i.e., defined firewall rules) in the network.

FIG. 2A includes a user 210 (e.g., a network administrator for an enterprise, a network administrator for a datacenter, etc.), a monitoring profile table 220 defined by the user 210, and a controller 250 (e.g., a controller machine of a management and control cluster of the datacenter). The monitoring profile table 220 includes several different columns (fields) including a name field 225, a criterion field 230, a priority field 235, a log field 240, and a log type (protocol) field 245. As will be described in more detail below by reference to FIG. 4A, security monitoring table 220 may include many more fields with each illustrated field in this figure having many more subfields that are not shown in this figure to simplify the description.

Controller 250 also includes several different dynamic (security) groups including dynamic groups 110 and 255. It should be noted that although the controller 250 is shown as storing only two security groups (e.g., as folders, containers, or any other data structures), the controller includes various other modules and data structures for controlling network traffic data exchange between different end machines of the network. These modules and data structures, however, are not shown in the figure as their utility is not related to the description of the figure.

FIG. 2A shows that the user 210 defines a monitoring policy for a network (e.g., a logical network of a tenant) through a management and control system of the network, one of the controllers of which is the controller 250. The user may define this policy through a set of API calls to a manager of the management and control system and the manager, in turn, configures the dynamic groups on the controller 250. As shown, the dynamic group 110 contains three virtual servers APP1(VM1-VM3), while the dynamic group 255 includes three virtual servers APP2(VM1-VM2) and APP1(VM3).

Although the monitoring policy is applied to the security rules, the monitoring profile for the network is defined independently from a security policy defined for the network. That is, some embodiments receive a security policy (from a network administrator) and generate a set of firewall rules to be applied to different entities of the network (e.g., end machines, forwarding elements, etc.). Although the defined network monitoring profile is received independent of the security policy, the monitoring profile is associated with the generated firewall rules through different dynamic groups. That is, each log generation rule of the monitoring profile is linked to a set of DCNs and specifies the logging behavior of the DCNs through a dynamic service group that is associated with the DCNs. Based on the specified logging behavior, each time a security operation is performed on network traffic (e.g., data messages) that is sent to or received from the DCNs, a resolution of such security operation is logged and sent to a log server.

For example, through the monitoring profile table 220, the user 210 specifies different logging policies for different sets of VMs of the network independent of a security policy that is defined for these sets of VMs. That is, the same or another user defines a security policy (such as security policy 105 shown in FIG. 1) that specifies how the network traffic should be forwarded between the VMs (and external networks). Defining the security policy results in generation of a set of security (e.g., firewall) rules that will be applied to network events associated with the VMs. The monitoring policy, on the other hand, defines when these generated security rules are applied to the network traffic of the VMs, which one should be reported to one or more log servers and which one should not.

The name field 225 includes the name of each record of the monitoring table 220, which describes for what group of DCNs the log generation rule corresponding to the record is defined. As shown, each name can have a descriptive value such as Business Critical Applications (BCA), VMs that operate in a particular subnet, VMs dedicated to a particular department (e.g., of an enterprise), etc. The criterion field 230, specifies the common attribute that all of the DCNs share. This shared attribute is also the common attribute that the DCNs associated with a dynamic group share. This way, a log generation rule can be associated with a dynamic group that was previously defined for the system (e.g., through a security policy rule). If a dynamic group was not previously defined, some embodiments create a new dynamic group for the DCNs that share the common attribute (i.e., having the same criterion) at the same time that the logging policy is defined.

The priority field 235, specifies the priority of a corresponding log generation rule. Datacenter is effectively a collection of applications that are provided to end users. Some of these applications are more important to monitor from security perspective compared to others. For example, a banking application in a banking enterprise could be significantly more important compared to, e.g., an information technology (IT) application that is open only for internal IT users. As such, when the log messages are queued to be sent to, or received by, a log server, some embodiments place the log messages generated by DCNs that implement the banking application at the top of the queue, while the log messages generated by DCNs that implement the IT application are placed at the bottom of the queue.

That is, a log message generated by a banking DCN will always be placed in front of a log message generated by an IT DCN, irrespective of which log message was placed in the queue first (e.g., even when the IT log message is placed in the queue first, a banking log message will be placed in front of the IT log message, if the IT message has not been processed by a log server yet). In other words, the priority field 235 specifies the importance of a log message and how quickly it should be reported to a monitoring server. Based upon the priority/criticality assigned to a log generation rule, a user could do relative throttling to manage total logging bandwidth.

The log field 240 defines the log policy corresponding with the log generation rule. This field defines whether an incoming and/or outgoing message that has triggered a firewall rule should be reported to a monitoring server or not. Log (event) messages usually include basic information about where, when, and why the log was generated and sent, which can help to identify the source of a network issue. This basic information may include Internet Protocol (IP) address of the sender device, timestamp (i.e., the time the log message is generated), a severity level of the log message (indicating how important the message is), the actual log message (e.g., describing a change in a forwarding element's configuration), etc.

Finally, the log type field 245 specifies the logging protocol that should be used when a log message is sent from a DCN to a log server. In some embodiments, an event logging protocol (e.g., syslog protocol, Netflow protocol, etc.) is deployed by different network devices (physical and/or logical devices) such as routers, switches, firewalls, servers (Unix server, Windows server, etc.), etc., to send the log (event) messages to a log application that runs on a log server (or on a cluster of log servers). The logging protocol of some embodiments, in addition to sending the log messages to a log server, stores the log messages locally in the devices that generated these messages. The log application (alone or in conjunction with other applications) collects, organizes, and filters the received logs. As an example, a DCN (e.g., a web or application layer virtual server) might send an access-denied event to a log server when an unauthorized user tries to connect to the web server (e.g., when a firewall rule defined for such is triggered).

The logging protocol, in some embodiments, uses a transport layer protocol such as User Datagram Protocol (UDP) to transmit the event messages across the network. Since UDP is a connectionless protocol, no confirmation or acknowledgment is received back from the log server. Lack of acknowledgment can translate to missing an event (however important) when the event message (i.e., one or more packets in the message) does not reach the log application. For this reason, some network devices, instead of UDP, use the Transmission Control Protocol (TCP) as the transport layer protocol.

Accordingly, the first record (first log generation rule) of the table 225 is named Banking App and is defined for all the DCNs tagged as "BCA". These DCNs may implement a particular distributed application (e.g., a banking application) or they may implement a layer of the application (e.g., a web layer, an application layer, or a database layer). The priority for sending the log messages (to a log server) for this rule is high (i.e., the messages should be placed on top of the queue) and all the firewall rules for packets sent to these DCNs or originated by the DCNs should be logged. Additionally, the logging protocol that is used is Netflow. Similarly, the second log generation rule is named APP2 and is defined for all the DCNs that are in the LS2 (logical switch 2) subnet. The priority for sending the log messages for this rule is medium and all the firewall rules for packets sent to these DCNs or originated from the DCNs should be logged. The logging protocol is also Netflow.

Each log generation rule, in a monitoring profile of some embodiments, determines whether the network traffic communicated with a set of DCNs should be logged or not. That is, a log generation rule determines whether data communication with an application running on a DCN should be reported to an event monitoring application or not. In order to make such a determination, some embodiments apply the monitoring policy on a set of security rules defined for the network traffic that is sent to and/or originated from the DCNs. These security (e.g., firewall) rules are generated based on a security policy that is defined for the network by a user (same or different user) in some embodiments.

By applying the logging policy to the security rules, each time a security rule is triggered (i.e., each time a firewall operation is performed on a data message that is sent to a VM or received from the VM), a logging policy (behavior) associated with the security rule determines whether the event should be reported to a security monitoring application (which runs on one or more log servers). That is, the logging policy determines whether a resolution of a security rule applied to a data message (i.e., a packet) sent to and/or received from a DCN, should be forwarded to a log server or not. A security rule for a DCN may be triggered, for example, when the specification of a data packet received at the DCN matches the specification of the firewall rule (e.g., when the five-tuple of the packet headers match the identification fields of the rule).

Some embodiments identify a dynamic group, with which a security rule is associated, each time the security rule is triggered. Identification of the dynamic group results in identifying a log generation rule that is associated with the dynamic group. Some embodiments apply a default logging policy to members of a dynamic group, for which a log generation policy is not defined (e.g., every triggered firewall rule that is not associated with a defined log generation rule will be reported to a monitoring application by default).

FIG. 2B shows the controller 250 connecting to two host machines 265 and 270. Host machine 265 includes a security agent 286, a managed forwarding element (MFE) 280, a security module 282, a security data storage (e.g., a distributed firewall (DFW) data storage) 284, and three DCNs 140, 165, and 170. Host machine 270 also includes a security agent, a security module, a local security rule storage, an MFE 285, and three other DCNs 145, 160, and 150. The dashed lines that connect the controller 250 to the host machines represent the control channels that exchange control plane data between the controller machine and the host machines in the physical network infrastructure over which the logical network is implemented.

In some embodiments, the controller 250 is part of a centralized management and control system (not shown in this figure) that includes one or more server computers (such as controller 250) that perform management and control operations for managing the network elements of a datacenter. The management and control system of some such embodiments is responsible for (1) receiving definitions of different logical network elements of different logical networks (e.g., belonging to different tenants), and (2) distributing the logical configuration and forwarding data to the managed forwarding elements (such as MFEs 280) to implement the logical forwarding elements of the logical networks. In addition to network topologies, the management and control system also receives definitions of security policy and network monitoring policy (i.e., logging policy) for one or more logical networks.

The management and controller system generates a set of distributed security (e.g., firewall) rules according to the defined security policy and creates an association between the monitoring policy rule (i.e., log generation rules) and the security rules. For example, controller 250 (1) generates the security rules and the log generation rules based on the security policy and monitoring policy definitions received from a user, and (2) associates the generated log generation rules with the generated security rules. In some embodiments, the controller creates this association by adding a logging parameter (i.e., "log" or "no log") to each security rule, which might have its flow-matching parameters specified in terms of traditional matching attributes (e.g., five tuple attributes) or in terms of higher level constructs. In some other embodiments, the controller generates a separate logging table with several records that are each associated with a security rule table's record.

In yet other embodiments, the controller and the hosts distributes the service rules and/or logging rules that are defined by reference to dynamic groups to a security module (such as the security module 282) in the data plane. Based on configuration data received from its controller and its host, the security module resolves the security rules (e.g., allows or drops the packets) that are defined in terms of higher constructs (e.g., in terms of dynamic groups) and log the resolution based on the logging behavior that is specified for the rule.

In some embodiments, the controller 250 distributes the generated security data and log policy data to a security agent 286 that executes on each host machine. The security agent 286 then associates the log generation rules with the security rules, e.g., by adding a logging parameter to each five-tuple security rule, or by populating a separate logging table that each of its records is associated with a security rule table's record (e.g., stored in the security rule data based 284).

In some embodiments, a local controller (not shown) executes on each host machine (e.g., in a hypervisor of the host machine) and configures a corresponding MFE to perform forwarding operations of the logical forwarding elements. In some such embodiments, each local controller receives common forwarding behavior that can be applied to VMs of several host machines, and converts this data to customized forwarding data that can be applied only to a single host machine on which the local controller executes.

As shown in FIG. 1, the logical switch 125 logically connects VM 140 that implements APP1 to VM 145 that also implements APP1 and to VM 150 that implements APP2 (APP1 and APP2 can be two different distributed applications or two different tiers of the same multi-tier application). Although all of these three VMs are coupled to logical ports of the same logical switch, as shown in FIG. 2B, only VM 140 is operating in the host machine 265. The other two VMs 145 and 150 are executing in the host machine 270.

In some embodiments, the connections of the VMs to logical switches (e.g. the first and second logical switches described above) are defined using logical ports of the logical switches, which are mapped to the physical ports of the MFEs 280 and 285. In the illustrated example, a first logical port of the logical switch 125 is mapped to a physical port of MFE 280, which is coupled to VM 140 running on the host machine 265. The second and third logical ports of the logical switch 125, however, are mapped to physical ports of MFE 285, which are connected to VMs 145 and 150 running on the host machine 270. The MFEs execute in the hypervisors of the host machines (not shown) in some embodiments. Therefore, these MFEs implement different logical forwarding elements of the logical network in order to exchange the network data between each other and other physical nodes of the physical network.

For example, when MFE 280 receives a packet from VM 140 that couples to the first port of the first logical switch, the MFE performs the network forwarding processing for the first logical switch, to which the VM is logically coupled. The same MFE, also performs the forwarding processing for any additional logical forwarding element (e.g., a logical router 120 that connects the logical switches 125 and 130 to each other). Based on the forwarding processing, MFE 280 can decide where to send the received packet. For example, if the MFE decides to send the packet from VM 145 to VM 160, which is coupled to the second port of the logical switch 125, MFE 280 sends the packet to MFE 285 (through a tunnel that is established between the MFEs). The second MFE 285 then forwards the packet to VM 160 (e.g., based on the MAC and IP addresses stored in the L2 and L3 headers of the packet).

As described above, a management and control system manages and controls the network data communications between the different DCNs of a logical network (e.g., between the VMs in the illustrated example) by controlling the data communications between the MFEs that implement the logical forwarding elements. The management and control system communicates management and control data with the MFEs (through the local controllers) in order to control the data exchange between the MFEs as virtual tunnel endpoints (VTEPs) that ultimately exchange the logical network data between the DCNs.

Additionally, the management and control system is responsible for generation, configuration, and management of different policies that a user (e.g., user 210) defines for the logical network such as a logical network security policy and network monitoring policy 220. After receiving the monitoring policy 220, determines which dynamic group includes the criterion defined for a log generation rule and embeds the criterion (i.e., the common attribute of the DCNs) into the dynamic group. Some embodiments, add the criterion to the dynamic group's data structure in order to make a link between the log generation rule and the dynamic group.

As shown in FIG. 2B, the "BCA" tag 260 is added to dynamic group 110, which holds three VMs that execute three instances of application APP1. The management and control system (e.g., controller 250 of the system) also adds criterion 262 (i.e., DCNs of subnet LS2) to the second dynamic group 255. That is, the second log generation rule, which is defined for all DCNs that are connected to logical switch 130 shown in FIG. 1, is linked to the dynamic group 255 which is associated with VMs 170, 160, and 165.

When a user defines a security policy, the management and control system generates a set of security rules based on the security policy definition and configures a security module 282 (through a security agent 286) on each host machine to apply the security rules to the network traffic that passes through the MFE of the host machine. This network traffic includes the data messages (i.e., packets) that are sent to, and/or originated from the VMs that run on the host machine. The security module 282 uses a local data storage 284 that includes the security rules in order to decide whether a packet should be allowed, dropped, or redirected. In some embodiments, the management and control system generates the security rules and stores them in the security storage 284 through the security agent 286. As described above, in some embodiments, a controller such as the controller 250 creates the associations between the security rules and the log rules, while in some other embodiments, the security agent 286 creates such associations.

The generated security rules (e.g., firewall rules), in some embodiments, are the typical five-tupple rules (e.g. source and destination IPs, source and destination ports, and service), accompanied by an action. In some other embodiments, as shown in the figure, the firewall rules include source and destination identifiers other than typical layer three (e.g., IP) identifiers. In some embodiments, the source and destination identifiers of each rule include dynamic groups instead of IP addresses. Security rule table 290 shows that instead of typical source and destination layer-three addresses, each firewall rule includes a dynamic group as the source identifier and a dynamic group as the destination identifier.

Table 290 also shows that based on the defined log generation rules, the management and control system assigns a logging policy to each of the DFW rules. For example, the first rule of the table that allows for network traffic to be forwarded from dynamic group SG1 (from any port) to dynamic group SG2 (at port 8080) is assigned to be logged if this rule is triggered. This is because SG1 is the dynamic group that is associated with the DCNs that are tagged as "BCA."

As shown, the first log generation rule of the monitoring profile specifies that any incoming or outgoing traffic related to the DCNs of this dynamic group has to be logged (when a corresponding firewall rule is triggered). As such, because the source identifier of the first DFW rule is also SG1, this rule will be logged once it is triggered. Conversely, the second rule is defined not to be logged when the rule is triggered. This rule specifies that any traffic from dynamic group SG2 to an external network has to be denied.

It is important to note that, although shown as a separate field 295 of the table 290, in some embodiments, the logging policies are not physically added to the firewall rules. In some such embodiments, each time a firewall rule is triggered, the log generation rule associated with the source and/or destination security group is identified (the security groups that contain the source and/or destination nodes) and the logging policy of the log generation rule is applied to the triggered firewall rule.

The firewall module 280 of some embodiments natively supports template-specific firewall rules. Template specifies firewall rules are firewall rules, in which source and destination addresses can be defined in terms of dynamic groups. The firewall module 280 can directly process firewall rules that are defined in terms of dynamic groups (as well as template identifiers). In processing a packet, the firewall module 280 will determine whether the packet's source and destination IP addresses are within a corresponding dynamic group, respectively.

In some embodiments, the firewall module uses a template identifier in the firewall rule (template identifiers are not shown in the firewall rules of this figure) in a dynamic group to identify template attributes of a source or destination node. The firewall module then uses the identified firewall attributes to process a firewall rule. For instance, when checking a template-based firewall rule for a packet, the firewall engine of some embodiments determines whether a source or destination IP address in the packet's header belongs to a dynamic group. If so, the firewall module of some embodiments uses the template identifier that the matching dynamic group specifies for the IP address to identify the template dynamic group to which the addressed source or destination node belongs.

The firewall module then accesses the identified template dynamic group to retrieve template attributes of the packet's source or destination node, and then uses these retrieved template attributes to further process the firewall rule. When the packet's header attributes and/or dynamic group attributes match a firewall rule, the firewall module determines that the packet matches the firewall rule and then performs the firewall action as specified by the rule's firewall service parameter. More details on template-specific firewall rules and how a firewall module processes these firewalls are discussed in the U.S. patent application Ser. No. 14/975,609, filed on Dec. 18, 2015, now issued as U.S. Pat. No. 10,305,858, which is incorporated herein by reference.

As described above, instead of, or in conjunction with, template-specific firewall rules, some embodiments generate five-tuple firewall rules and store these rules in the DFW rules data storage 284 to be used by the DFW module 282 in order to associate each firewall rule to a log generation rule (through a dynamic group for which the log generation rule is defined). Associating the log generation rules to firewall rules (five-tuple rules or template-specific rules) through dynamic groups allows a user to change a logging policy for several different rules by simply changing a log generation rule in the monitoring profile. It also enables the network to dynamically add a monitoring policy to any DCN that is added to a dynamic group, and to remove the policy for any DCN that leaves the dynamic group without any user intervention.

One of ordinary skill in the art would realize that the number of host machines and VMs illustrated in the figure are exemplary and a logical network for a tenant of a hosting system may span a multitude of host machines, and logically connect a large number of DCNs to each other (and to several other physical devices that are connected to hardware switches). Additionally, while shown as VMs in this figure and other figures below, it should be understood that other types of data compute nodes (e.g., namespaces, containers, etc.) may connect to logical forwarding elements in some embodiments. Furthermore, each host machine includes many more elements besides the illustrated elements, which are not shown in the figure for simplicity of description.

As described above, some embodiments allow a user to specify log behavior for a network events in terms of higher level constructs (dynamic service groups). A dynamic service group is associated with, e.g., a particular type of application, different types of applications, particular network constructs such as subnets, different logical network constructs, etc., and as such, by defining a log behavior for a particular dynamic service group, the log behavior will be applied to all of the network constructs that are associated with the dynamic group.

Some embodiments provide a framework in order to associate this log behavior with the service rules (e.g., security rules) that are being implemented by the service nodes (e.g., security filters operating in the host machines) in the network. The framework implements the application of log behavior on network constructs differently in different embodiments. For example, in some embodiments, a controller creates the association between log behavior and service behavior by adding a log parameter to each 5-tuple service rule that the controller distributes to the host machines.

In some other embodiments, the controller distributes, to the host machines (e.g., to the security agents of the host machines), the service rules (e.g., 5-tuple service rules) and log rules in separate data structures (e.g., separate tables). The security agents of the host machines (such as the security agent 286) then associate the service and log rules (e.g., by inserting log behavior in the service rules, or creating associations between the service rules and log rules). In yet other embodiments, the controller sends group-based log rules (i.e., log rules that have their flow identifiers expressed in terms of one or more parameters that may include group identifiers) to a security agent that operates on each host machine, and the security agent either adds a log parameter to each service rule, or associates a log record of a logging table to each service rule's record.

In some embodiments, a controller sends group-based logging rules to a security agent operating on a host machine and the security agent pushes the group-based logging rules to a service filter (such as the security module 282 shown in FIG. 2B above) in the data plane. The service filter, in some such embodiments, is configured to resolve service rules (e.g., firewall rules) that are defined in terms of higher level constructs. That is, the service filter receives (from a security agent) the required definitions (including the service group definitions) for resolving the service rules that are defined in terms of higher level constructs.

Figure 3:
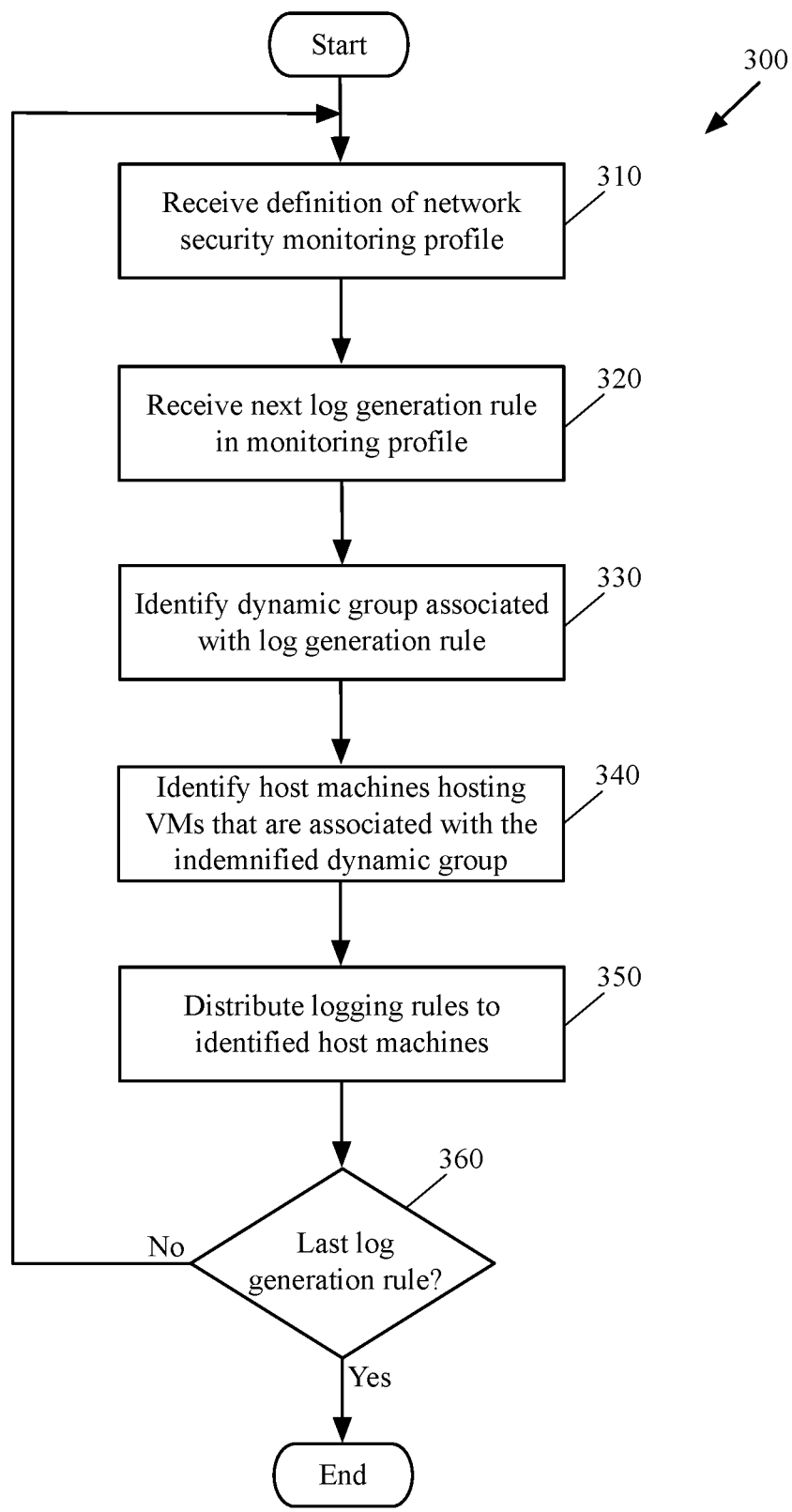
FIG. 3 conceptually illustrates a process of some embodiments for associating a log generation rule (in a security monitoring profile) with a dynamic group in order to apply a logging policy in the log generation rule to a set of security rules.

FIG. 3 conceptually illustrates a process 300 of some embodiments for associating a log generation rule (in a security monitoring profile) with a dynamic group in order to apply a logging policy in the log generation rule to a set of security rules such as firewall rules. The process is performed by a management and control system that manages one or more logical networks and controls data communication between different logical network entities over a physical network infrastructure. The process can be performed, e.g., by a manager or a controller machine of a central management and control system.

The process initiates by receiving (at 310) a definition of a network security monitoring profile. The monitoring profile is defined by a network administrator (e.g., of a datacenter) in some embodiments and includes several log generation rules that are defined for different groups of DCNs associated with different network constructs having particular network characterizations. The different log generation rules are separated based on different criteria defined for different groups of applications or DCNs that implement the applications.

A user may define different monitoring profiles that can be activated based on different network requirements. When a packet or data flow hits a firewall rule (i.e., the rule's identification data matches the identification data in the packet's headers), based upon the logging policy for the dynamic group of the rule, and the current active monitoring profile, a log message would be generated, marked and implemented at the data or the control plane.

For example, the user can define a holiday season monitoring profile with a log generation rule that limits amount of loggings during a peak business period for a particular application implemented by several different servers. For the same application, the user may define a normal season monitoring profile, in which the log generation rule allows all firewall transactions to be logged. This way, the user simply changes the monitoring profile with change of seasons and the firewall rules will be automatically updated to produce, or not to produce log messages once the rules are triggered. As another example, the user may define a malicious attack monitoring profile which when activated, turns off all the loggings of non-critical applications in order to reduce the noise in the network during an attack.

The process 300 then receives (at 320) the first log generation rule in the monitoring policy. At 330, the process identifies the criterion defined in the received log generation rule. This criterion, is the common attribute that a group of DCNs share. In other words, the criterion defined in a log generation rule is what links the log generations rule to a dynamic service group. The process, based on the identification of the dynamic group, identifies (at 340) the host machines that host DCNs that are associated with the dynamic group. In some embodiments, the process, through the control plane, identifies the DCNs that are tagged with the identified dynamic group. The process then identifies the host machines on which, these tagged DCNs are executing.

The process then distributes (at 350) the logging rules generated for the log generation rule to the identified host machines (i.e., to the security agents that operate on the identified host machines). As described above, the process of some embodiments generates a logging rule for each service rule and distributes these generated logging rules to the host machines. In some embodiments, the security agents create the association between the logging rules and service rules and configure the service filters operating on the same host machines to apply the logging rules on security services that are applied to the data messages.

After distributing the logging rules generated for the log generation rule to the identified host machines, the process determines (at 360) whether the processed log generation rule is the last rule in the defined monitoring profile. If the process determines that there are more log generation rules in the profile, the process returns to operation 320 to receive the next rule in the profile and process the rule. If the process determines that the processed log generation rule was the last rule in the profile, the process ends.

The specific operations of the process 300 may not be performed in the exact order shown and described. The specific operations may not be performed in one continuous series of operations, and different specific operations may be performed in different embodiments. Additionally, one of ordinary skill in the art would realize that the process 300 could be implemented using several sub-processes, or as part of a larger macro process.

As described above, one of the benefits of associating the log generation rules with dynamic groups is that a monitoring policy can be dynamically added to any DCN that currently associated with a dynamic group, or that will be added to the dynamic group at a later time. The logging policy can also be dynamically removed from any DCN that leaves the dynamic group (e.g., transferred to a different dynamic group). For example, as soon as a new VM is instantiated in a host machine, based on which dynamic group the VM is tagged to, a new monitoring policy for network communications with the VM is defined. Similarly, when a VM is transferred from a first dynamic group to a second dynamic group, the logging policy of the VM is changed from a logging policy that is defined for the first dynamic group to a logging policy that is defined for the second dynamic group.

FIGS. 4A-4D illustrate how a security group creates an association between a logging policy defined in a log generation rule and multiple firewall rules defined in multiple formats. FIG. 4A includes a network security monitoring profile 410, a controller 430, and a firewall rule table 450. The monitoring profile 410 is similar to the network monitoring profile 220 in FIG. 2A above, with the exception that the log column 240 is expanded in this figure and it now includes four different subfields in the log inbound and outbound field 420.

More specifically, each log generation rule in this figure includes a logging policy for each incoming packet that will be allowed or denied, and a logging policy for each outgoing packet that will be allowed or denied. Field 420 of the table may even have more subfields in other embodiments. For example, this field can have subfields for each incoming and/or outgoing packet that should be dropped, redirected, etc. The first log generation rule specifies that when a received packet matches a firewall rule, no matter the packet is allowed in or not, a log should be generated and reported (e.g., to a log server) using a netflow protocol. The first rule also indicates that every outgoing packet that matches a rule, irrespective of being allowed or denied, must be logged too. The third log generation rule in the table, on the other hand, indicates that every packet that is allowed, either incoming, or outgoing, should not be logged, while packets that are denied, both incoming and outgoing, should be logged.

The security group 440 in the controller 430 includes three DCNs APP1(VM1-VM3). This security group, as shown, is associated with the first log generation rule of the security monitoring profile 410. As such, four highlighted rules 455-470 are affected by the first log generation rule because these firewall rules include either source, or destination IP addresses that are associated with the VMs of the security group 440.

For example, firewall rule 455 indicates that any packet with source IP address of A1V1_IP and destination IP address of A2V1_IP should be allowed. Since the source IP address of the rule belongs to one of the VMs of the security group 440 (i.e., APP1-VM1), this firewall rule is associated with the first log generation rule of the security monitoring profile 410. Therefore, whenever this rule is triggered, the event must be logged according to the logging policy defined in the log generation rule.

As another example, firewall rule 465 specifies that any packet with source IP address of A2V1_IP and destination IP address of A1V3_IP should be denied. Since the destination IP address of the rule is associated with another one of the VMs in the security group 440 (i.e., APP1-VM3), this firewall rule is also associated with the first log generation rule and therefore, whenever this rule is triggered, the event must be logged. As shown in this figure, some of the log policy fields in the table are identified with an asterisk ("*"). The asterisk indicates that no logging policy is yet defined for a corresponding security rule and as such a default logging rule should be applied to the corresponding security rule, when the security rule is triggered.

As stated above, the default logging policy for a security rule can be, whenever the security rule is applied on a data massage, generate a log for the event and send the generated log to a log server. For example, the first record of security table 450 indicates that whenever a packet is received from an external network with source IP address of EXT_IP for a destination VM with IP address of A2V1_IP, drop the packet and log the event (assuming that the default logging policy is "to log" any network event for which a logging policy is not defined).

Although the firewall table shown in FIG. 4A includes typical five-tuple firewall rules, as described above and shown next in FIG. 4B, some embodiments generate and use a firewall table that includes template-specific firewall rules. That is, each firewall rule has a security group as a source or destination identifier. For these types of rules, when a firewall rule is triggered, a security group corresponding to the source or destination identifier of the rule is identified.

FIG. 4B shows the same network monitoring policy and controller that was shown in FIG. 4A. However, in this figure the security table 475 is different than the security table 450 shown in FIG. 4A. That is, unlike security table 450, the source and destination identifiers in the security table 475 are security group identifiers and not IP addresses of the source and destination machines. For example, the source identifier of security rule 477 is the dynamic group SG1, while the destination identifier is the dynamic group SG2.

This means that for any data message received from any DCN that is associated with the dynamic group SG1, and that is destined for a DCN associated with the dynamic group SG2, the network event has to be logged (based on the first log generation rule defined in the log profile table 410). Similarly, the security rule 479 indicates that for any data message received from a DCN associated with the dynamic group SG2 and destined for a DCN associated with the dynamic group SG2, the network event has to be logged as well.

Some embodiments, after identifying the security group in the source or destination address of the security rule, identify security attributes that are associated with each DCN of the security group (the attributes can be found in the same, or another security group). Based on the security attributes (e.g., source IP address, destination IP address, etc.), when these embodiments match the security attributes with the identification data found in a packet that has triggered the rule and take the required action defined in the security attributes. As stated above, template-specific firewall rules, and how this type of firewall rules are processed, are discussed in great details in U.S. patent application Ser. No. 14/975,609.

FIG. 4C shows the same network monitoring policy, controller, and firewall rule table that is shown in FIG. 4A. However, in this figure, as shown, a new VM is added to the security group 440. VM 480 is added to the security group after, e.g., this VM instantiated in a host machine to implement application APP1 (i.e., to implement an instance of this application). Since the logging policy is defined for the security group and not individual VMs, immediately after this new VM 480 is tagged as a member of the security group 440, a corresponding logging policy will be dynamically attached to the firewall rules that are defined for this VM.

As shown in the figure, the firewall rule 485, which is highlighted in the firewall table, indicates that whenever this rule is triggered, a log will be generated and reported to a log server. This is because, the source IP address of rule 485 includes the IP address that belongs to VM 480. On the other hand, the security group 440, to which VM 480 belongs, is associated with the first log generation rule of the monitoring policy. This logging policy of this log generation rule indicates that any outgoing (outbound) packet that matches this firewall rule, irrespective of being allowed or denied, should generate and report a log.

FIG. 4D shows the same network monitoring policy and controller that is shown in FIG. 4C. However, in this figure, the firewall table 490 does not include the logging policies that were included in the firewall table 450 shown in FIG. 4C. Instead, in this figure a separate logging table 492 is generated (e.g., by a controller machine, or a security agent that operates on each host machine) and linked to the security table 490. That is, as shown, for each record of the security table 490, the logging table 492 has a corresponding record containing a pointer field 494 that links the records of the two tables, and a policy field 496 that indicates whether the corresponding security rule in the security table 490 should be logged or not.

The pointer field 494 may include an address of each corresponding record in order to point to that record or a unique index that is shared with the corresponding record in the security table 490. It should be understood that the table 492 in the illustrated figure is shown as having only two fields, a log table that is associated with a security rule table may have many more fields that store other related data for logging and security purposes.

As described above, linking a log generation rule of a security monitoring profile to a dynamic group, not only associates a logging policies to a set of firewall rules, but also enables a user (e.g., a datacenter provider) to dynamically add, remove, or modify logging policies for several different DCNs by simply modifying a rule's definition. For example, every time a monitoring policy in a log generation rule is updated, the logging policy of every DCN, for which the monitoring policy is defined (i.e., all of the DCNs of the dynamic group linked to the log generation policy), will be automatically updated.

Some embodiments identify a dynamic group, with which a firewall rule is associated, each time the firewall rule is triggered. Identification of the dynamic group results in identifying a log generation rule that is associated with the dynamic group. Therefore, a modification in the logging policy of a log generation rule, at any particular instance of time, will result in application of the modified policy to any firewall rule that is triggered after the particular instance of time.

Figure 5:
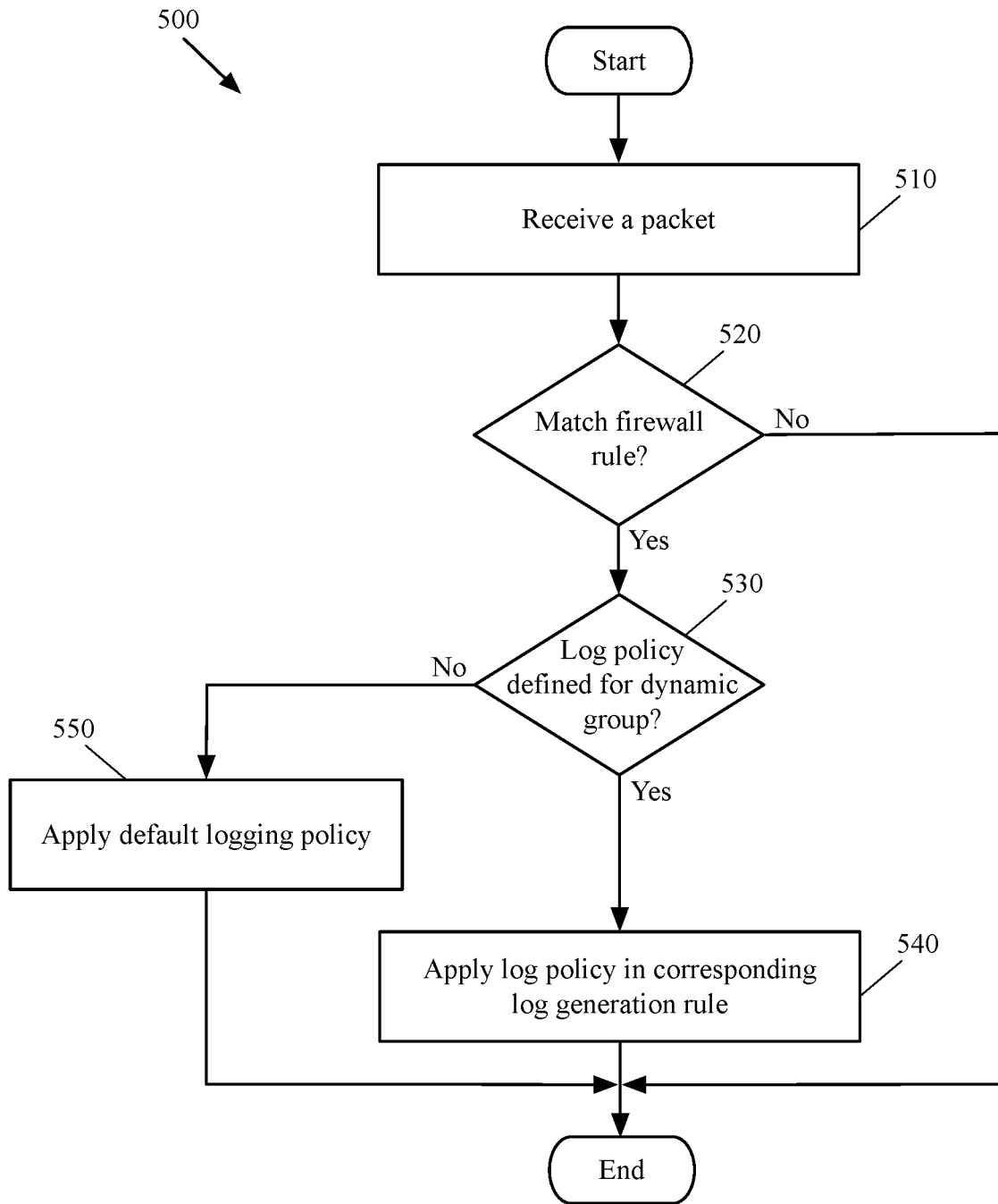
FIG. 5 conceptually illustrates a process of some embodiments for determining a logging policy for a triggered firewall rule, which can be either a policy defined in an associated log generation rule, or a default logging policy.

FIG. 5 conceptually illustrates a process 500 of some embodiments for determining a logging policy for a triggered firewall rule, which can be either a policy defined in an associated log generation rule, or a default logging policy. This process, in some embodiments, is performed by a firewall module such as the firewall module or engine that runs on a host machine (e.g., in a hypervisor of the host machine). The process starts by receiving (at 510) a packet. The process then determines (at 520) whether the received packet matches any of the firewall rules (e.g., that is generated based on a security policy defined by a user).

In order to make such determination, some embodiments determine whether a firewall rule containing the same identification data as carried by the packet is among the firewall rules. For example, if the generated firewall rules are typical five-tuple rules, these embodiments determine whether source and destination IP address, source and destination ports, and the protocol defined in the packet headers match the same fields defined in a firewall rule. As described above, instead of IP addresses, some embodiments determine whether security groups defined as source and destination identifiers of the rules match the source and destination addresses of the packet. Either way, if the process determines that no generated firewall rule matches the identification data of the packet, the process ends.

On the other hand, if the process determines that at least one of the firewall rules (e.g., the highest priority firewall rule) matches the identification data of the packet, the process determines (at 530) whether a log policy is associated with a particular dynamic group to which, the source and/or destination node of the packet belongs. If the process determines that no log generation rule is associated with the particular dynamic group, the process applies (at 550) a default logging policy to the triggered firewall rule. In some embodiments, when a user does not define any log generation rule that can be linked to a security group, in a monitoring profile, the process will not find a corresponding log generation rule for that security group. The default logging policy, for example, can be generating a log for every triggered firewall or not generating a log for the triggered firewall rules. After applying the default logging policy, the process ends.

When the process determines (at 530) that a log policy is associated with a particular dynamic group, the process identifies a log generation rule that is associated with the dynamic group and applies (at 540) the logging policy defined in the log generation rule to the triggered firewall rule. As described above, some embodiments embed a reference that points to a log generation rule in a dynamic group that is associated with the log generation rule. The process of some embodiments can identify the associated log generation rule by using the embedded reference. The process then ends.

The specific operations of the process 500 may not be performed in the exact order shown and described. The specific operations may not be performed in one continuous series of operations, and different specific operations may be performed in different embodiments. Additionally, one of ordinary skill in the art would realize that the process 500 could be implemented using several sub-processes, or as part of a larger macro process.

FIG. 6 illustrates an example of modifying a logging policy by changing a field in a log generation rule and dynamically applying the modified policy on a corresponding firewall rule (i.e., without making any modification in any of the firewall rules). More specifically, this figure shows, in two separate instances of time, T1 and T2, how two different logging policies are applied to a same firewall rule without changing the security policy or any other configuration that was used in generation of this firewall rule. This figure includes a monitoring profile that includes a log generation rule 640 and a firewall table 650 that includes a firewall rule 630.

The top half of the figure shows that at time T1, a firewall rule 630 is triggered (as illustrated, the rule is highlighted at this time). For example, a virtual machine VM1 that implements an instance of APP1, having an IP address of V1A1_IP, has generated and forwarded a packet to a managed forwarding element of a host machine on which the VM executes. A firewall engine that is coupled to the MFE (e.g., running in a same hypervisor as the MFE), checks the packet against a set of firewall rules in the table 650 and realizes that the packet's source address matches the source address in firewall rule 630. Since this firewall rule is associated with the log generation rule 640 (through a dynamic group), the firewall engine from the allowed outbound field 620 realizes that a log should be generated and reported. Therefore, the firewall module generates and sends a log message for this triggered firewall rule to a log server.

The bottom half of the figure shows that at time T2, a user has simply changed the logging policy in the allowed outbound field 620 of the log generation rule from "Yes" to "No." This change specifies that no log is required to be generated and reported, when a firewall rule that allows a packet to be sent out by a DCN in the security group "BCA" is hit. Therefore, as shown, at T2 (or any time after T2 for that matter) when the firewall rule 630 is triggered, no log message is generated by the firewall engine. This is because, this firewall rule is associated with the log generation rule 640 (through a dynamic group). As such, the firewall engine from the allowed outbound field 620 realizes that a log should not be generated and reported. Therefore, the firewall module does not generate a log message for this triggered firewall rule (until and unless a user makes another change in the settings of the monitoring profile).

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
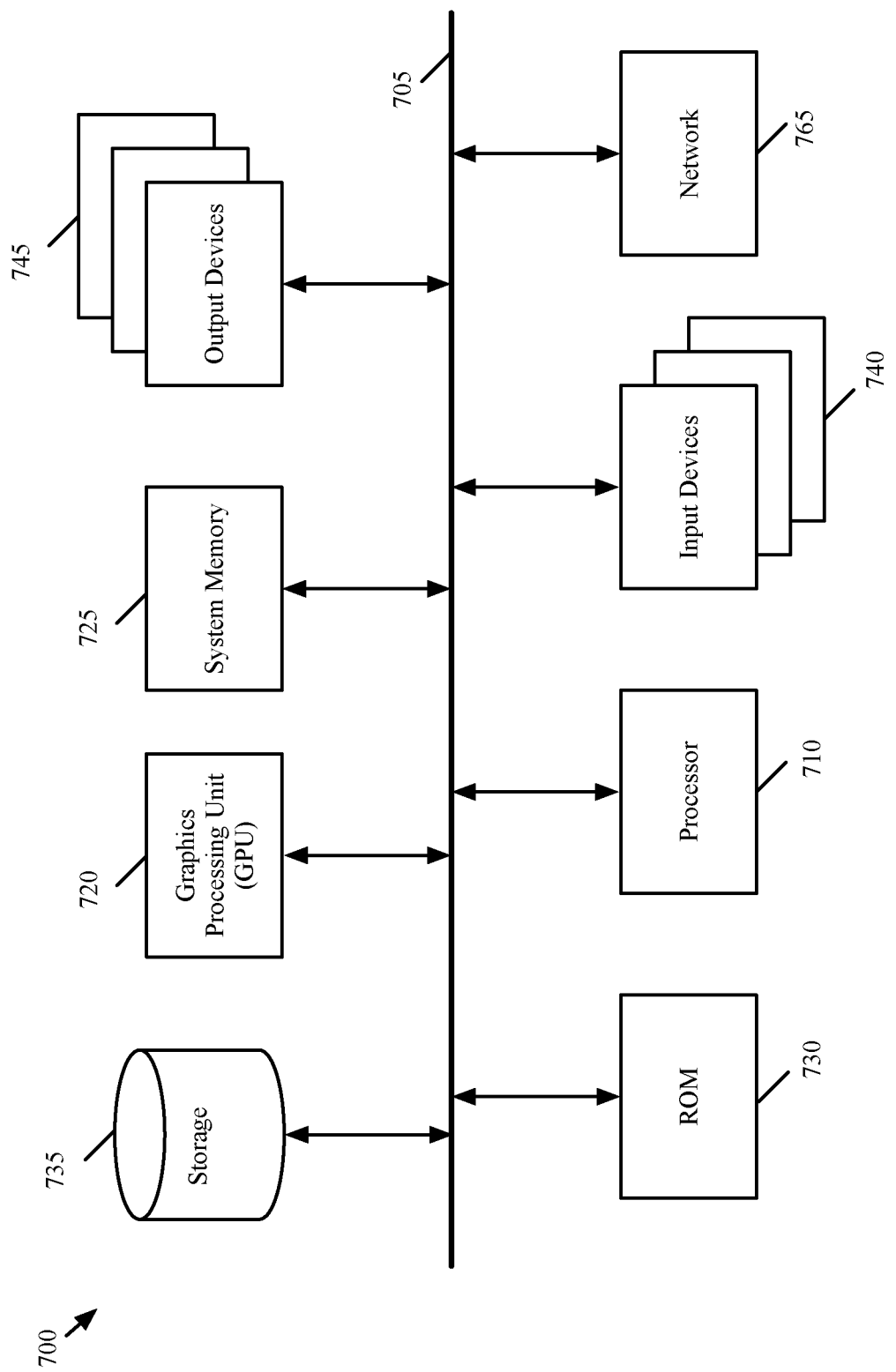
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash memory device, etc., and its corresponding drive) as the permanent storage device. Like the permanent storage device 735, the system memory 725 is a read-and-write memory device. However, unlike storage device 735, the system memory 725 is a volatile read-and-write memory, such a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" or "data message" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium, of a host computer of a hosting system, that stores a program which when executed by at least one processing unit of the host computer generates security-based logs for data compute nodes (DCNs) executing on the host computer, the program comprising sets of instructions for:
   receiving a data message associated with a particular DCN that belongs to a dynamic security group comprising a set of DCNs including the particular DCN that share a particular characteristic;
   performing a firewall operation on the data message;
   identifying a log generation rule that is specified for the dynamic security group and indicates whether to log firewall operations that are performed on data messages associated with DCNs having the particular characteristic of the dynamic security group; and
   when the identified log generation rule specifies to log firewall operations performed on data messages associated with the DCNs having the particular characteristic, logging the firewall operation that is performed on the data message.

2. The non-transitory machine readable medium of claim 1, wherein the set of instructions for receiving the data message comprises a set of instructions for receiving the data message from the particular DCN.

3. The non-transitory machine readable medium of claim 1, wherein the data message is directed to the particular DCN.

4. The non-transitory machine readable medium of claim 1, wherein the program further comprises sets of instructions for identifying the dynamic security group to which the particular DCN belongs based on a set of identification data carried by the received data message.

5. The non-transitory machine readable medium of claim 1, wherein the program further comprises sets of instructions for, before receiving the data message:
   receiving a membership for the dynamic security group, said membership including the particular DCN;
   receiving the log generation rule and association of the log generation rule with the dynamic security group;
   specifying a security-operation rule for performing the firewall operation on data messages associated with the particular DCN; and
   using the membership and the log generation rule to specify a set of logging parameters for the security-operation rule, said logging parameters for use to determine how to log a firewall operation that is performed on a data message associated with the particular DCN.

6. The non-transitory machine readable medium of claim 5, wherein the specified logging parameters comprise at least one of (i) a priority level that defines how urgently the firewall operation should be logged compared to other operations associated with other log generation rules and (ii) a logging protocol for reporting the firewall operation.

7. The non-transitory machine readable medium of claim 1, wherein the data message is an incoming data message, wherein the set of instructions for logging the firewall operation comprises a set of instructions for logging a resolution of the firewall operation performed on the incoming data message,
   wherein the program further comprises a set of instructions for foregoing logging a resolution of the firewall operation performed on the incoming data message when the identified log generation rule specifies not to log firewall operations performed on data messages associated with the DCNs having the particular characteristic.

8. The non-transitory machine readable medium of claim 1, wherein the data message is an outgoing data message, wherein the set of instructions for logging the firewall operation comprises a set of instructions for logging a resolution of the firewall operation performed on the outgoing data message, wherein the program further comprises a set of instructions for foregoing logging a resolution of the firewall operation performed on the outgoing data message when the identified log generation rule specifies not to log firewall operations performed on data messages associated with the DCNs having the particular characteristic.

9. The non-transitory machine readable medium of claim 8, wherein the resolution comprises one of (i) dropping the data message instead of sending the data message out and (ii) allowing the data message to be sent out.

10. The non-transitory machine readable medium of claim 1, wherein the program further comprises a set of instructions for removing the particular DCN from the dynamic security group, wherein the log generation rule is no longer used to determine whether to log data messages associated with the particular DCN after the DCN is removed from the dynamic security group.

11. A method for generating security-based logs for data compute nodes (DCNs) executing on a host computer of a hosting system, the method comprising:

receiving a data message associated with a particular DCN that belongs to a dynamic security group comprising a set of DCNs including the particular DCN that share a particular characteristic;

performing a firewall operation on the data message;

identifying a log generation rule that is specified for the dynamic security group and indicates whether to log firewall operations that are performed on data messages associated with the DCNs having the particular characteristic of the dynamic security group; and when the identified log generation rule specifies to log firewall operations performed on data messages associated with the DCNs having the particular characteristic, logging the firewall operation that is performed on the data message.

12. The method of claim 11, wherein the data message is received from the particular DCN.

13. The method of claim 11, wherein the data message is directed to the particular DCN.

14. The method of claim 11 further comprising identifying the dynamic security group to which the particular DCN belongs based on a set of identification data carried by the received data message.

15. The method of claim 11, wherein the method further comprises, before receiving the data message:

receiving a membership for the dynamic security group, said membership including the particular DCN;

receiving the log generation rule and association of the log generation rule with the dynamic security group;

specifying a security-operation rule for performing the firewall operation on data messages associated with the particular DCN; and using the membership and the log generation rule to specify a set of logging parameters for the security-operation rule, said logging parameters for use to determine how to log a firewall operation that is performed on a data message associated with the particular DCN.

16. The method of claim 15, wherein the specified logging parameters comprise at least (i) a priority level that defines how urgently the firewall operation should be logged compared to other operations associated with other log generation rules and (ii) a logging protocol for reporting the firewall operation.

17. The method of claim 11, wherein the data message is an incoming data message, wherein logging the firewall operation comprises logging a resolution of the firewall operation performed on the incoming data message, wherein when the identified log generation rule specifies not to log firewall operations performed on data messages associated with the DCNs having the particular characteristic, the host machine foregoes logging a resolution of the firewall operation performed on the incoming data message.

18. The method of claim 11, wherein the data message is an outgoing data message, wherein logging the firewall operation comprises logging a resolution of the firewall operation performed on the outgoing data message, wherein when the identified log generation rule specifies not to log firewall operations performed on data messages associated with the DCNs having the particular characteristic, the host machine foregoes logging a resolution of the firewall operation performed on the outgoing data message.

19. The method of claim 18, wherein the resolution comprises one of (i) dropping the data message instead of sending the data message out and (ii) allowing the data message to be sent out.

20. The method of claim 11 further comprising removing the particular DCN from the dynamic security group, wherein the log generation rule is no longer used to determine whether to log data messages associated with the particular DCN after the DCN is removed from the dynamic security group.

* * * * *